US011931877B2

(12) United States Patent
Lachica Koch et al.

(10) Patent No.: US 11,931,877 B2
(45) Date of Patent: Mar. 19, 2024

(54) ARRANGEMENT FOR A HAND-HELD POWER TOOL, AND HAND-HELD POWER TOOL

(71) Applicant: Hilti Aktiengesellschaft, Schaan (LI)

(72) Inventors: Daniela Lachica Koch, Augsburg (DE); Olaf Koch, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 732 days.

(21) Appl. No.: 17/045,797

(22) PCT Filed: Apr. 17, 2019

(86) PCT No.: PCT/EP2019/059921

§ 371 (c)(1),
(2) Date: Oct. 7, 2020

(87) PCT Pub. No.: WO2019/206762

PCT Pub. Date: Oct. 31, 2019

(65) Prior Publication Data

US 2021/0023690 A1 Jan. 28, 2021

(30) Foreign Application Priority Data

Apr. 25, 2018 (EP) .................................... 18169227

(51) Int. Cl.
*B25G 3/00* (2006.01)
*A45F 5/00* (2006.01)
*B25F 5/02* (2006.01)

(52) U.S. Cl.
CPC ................ *B25F 5/026* (2013.01); *A45F 5/00* (2013.01); *A45F 2005/006* (2013.01); *A45F 2200/0575* (2013.01)

(58) Field of Classification Search
CPC .......... Y10S 16/90; B25F 5/024; B25F 5/026; B25F 5/02; B25F 5/006; B24B 23/00;
(Continued)

(56) References Cited

U.S. PATENT DOCUMENTS 3,148,568 A * 9/1964 Hoza ...................... B25F 5/026
81/177.1
4,368,556 A * 1/1983 Wanner ................ B23B 45/001
451/344
(Continued)

FOREIGN PATENT DOCUMENTS

CN 201552562 U 8/2010
CN 105729412 A 7/2016
(Continued)

OTHER PUBLICATIONS

International Search Report of PCT/EP2019/056925, dated Jun. 26, 2019.

*Primary Examiner* — Chuck Y Mah
(74) *Attorney, Agent, or Firm* — Davidson, Davidson & Kappel, LLC

(57) ABSTRACT

An assembly includes a side handle for a hand-held power tool and includes an eyelet device which includes an eyelet portion which is configured to be connected to a safety belt, wherein the side handle includes a clamping ring which is configured to attach the side handle to a round portion of the hand-held power tool, and wherein the eyelet device is configured to be attached to the clamping ring.

19 Claims, 4 Drawing Sheets

(58) Field of Classification Search
CPC ......... B24B 23/005; B24B 29/00; B27B 9/00; B25G 1/06; B25G 1/00; B25G 3/38; A45F 5/00; A45F 2005/006; A45F 2200/0575
See application file for complete search history.

(56) References Cited

U.S. PATENT DOCUMENTS

| | | | | | |
|---|---|---|---|---|---|
| 4,974,764 | A * | 12/1990 | Cantwell | B25H 3/00 | 224/904 |
| 5,921,657 | A * | 7/1999 | Case | A45F 5/02 | 362/103 |
| 7,392,568 | B2 * | 7/2008 | Koschel | B25F 5/026 | 16/436 |
| 8,782,910 | B1 * | 7/2014 | Lofton | B23D 59/00 | 30/297 |
| 10,898,998 | B2 * | 1/2021 | Hurst | B25F 5/026 | |
| 2002/0125022 | A1 * | 9/2002 | Dieterle | B25F 5/026 | 173/170 |
| 2004/0065709 | A1 * | 4/2004 | Dillenberger | A45F 5/02 | 224/904 |
| 2008/0163464 | A1 * | 7/2008 | Baumann | A45F 5/02 | 24/3.12 |
| 2009/0133889 | A1 | 5/2009 | Keller et al. | | |
| 2009/0276979 | A1 * | 11/2009 | Kauffman | A45F 5/00 | 24/3.13 |
| 2010/0107423 | A1 | 5/2010 | Bodine | | |
| 2011/0042533 | A1 * | 2/2011 | Austin | A45F 5/02 | 248/220.21 |
| 2012/0067931 | A1 * | 3/2012 | Yanosick | A45C 13/30 | 224/257 |
| 2013/0062498 | A1 | 3/2013 | Ito et al. | | |
| 2014/0013544 | A1 * | 1/2014 | Moreau | A44B 13/0058 | 24/3.12 |
| 2014/0097217 | A1 * | 4/2014 | Walsh | A45F 5/02 | 224/268 |
| 2015/0164161 | A1 * | 6/2015 | Moreau | A45F 5/00 | 2/170 |
| 2016/0192766 | A1 | 7/2016 | Moreau et al. | | |
| 2018/0070713 | A1 * | 3/2018 | Moreau | A45F 5/00 | |
| 2018/0084894 | A1 * | 3/2018 | Moreau | A45F 5/021 | |
| 2018/0156385 | A1 * | 6/2018 | Giglio | B25F 5/02 | |
| 2018/0236629 | A1 * | 8/2018 | Gonzalez | B24B 23/005 | |
| 2020/0047323 | A1 * | 2/2020 | Moreau | B25H 3/00 | |

FOREIGN PATENT DOCUMENTS

| | | | | |
|---|---|---|---|---|
| CN | 107378870 | A | 11/2017 | |
| DE | 29918101 | U1 * | 12/1999 | B25F 5/02 |
| DE | 102008040570 | A1 * | 1/2010 | B24B 23/005 |
| DE | 102015206622 | A1 | 10/2016 | |
| EP | 2065142 | A1 | 6/2009 | |
| EP | 2716413 | B1 | 12/2016 | |
| WO | 2 678 137 | B1 | 4/2015 | |

* cited by examiner

ARRANGEMENT FOR A HAND-HELD POWER TOOL, AND HAND-HELD POWER TOOL

FIELD OF THE INVENTION

The present invention relates to an assembly for a hand-held power tool, and to a hand-held power tool.

BACKGROUND

Hand-held power tools can be designed, for example, as battery-operated hand-held power tools. Furthermore, a hand-held power tool can comprise a main handle which is arranged at the rear, and a side handle which is arranged at the front. The side handle is generally fastened rotatably to the hand-held power tool. The hand-held power tool here can comprise a locking means for locking the side handle.

Hand-held power tools of this type can be used even at certain heights, for example on high buildings or scaffolding. In order to avoid a hand-held power tool falling off and thereby causing bodily harm, it may be a requirement for the hand-held power tool to be fastened to a person or an object by means of a safety belt. The hand-held power tool may comprise, for example, an eyelet device to which the safety belt can be fastened.

For example, EP 2 678 137 B1 discloses an eyelet device which is attached to the main handle.

SUMMARY OF THE INVENTION

It is an object of the present invention to provide an improved assembly for a hand-held power tool.

Accordingly, the present invention provides an assembly comprising a side handle for a hand-held power tool and comprising an eyelet device. The eyelet device comprises an eyelet portion which is configured to be connected to a safety belt. The side handle comprises a clamping ring which is configured to attach the side handle to a round portion of the hand-held power tool. The eyelet device is configured to be attached to the clamping ring.

By the eyelet device being attachable to the clamping ring, the safety belt can be connected ergonomically to the side handle and therefore to the hand-held power tool. The eyelet device here is in the field of view of an operator operating the hand-held power tool. Furthermore, it is possible to avoid the eyelet device being fastened to a housing of the hand-held power tool. This has the advantage that the housing does not need to be redesigned and does not need to be redimensioned. Furthermore, the eyelet device can be attached, for example, to existing side handles that were not hitherto envisaged for such use. For example, an existing side handle can thus be retrofitted with an eyelet device in a simple manner. Furthermore, there is the advantage that the clamping ring is in any case dimensioned for transmitting high forces that are introduced from the side handle. It is thus also possible for forces that are introduced into the side handle from the eyelet device to be supported without additional outlay.

The hand-held power tool is, for example, a hammer drill, a chisel hammer, a core drill, a grinding machine, a screwdriver, a bolt driver or a saw. The hand-held power tool preferably comprises a motor for setting a cutting-off means, such as for example a drill or a saw blade, in rotation. The hand-held power tool preferably furthermore comprises a tool fitting which is designed to fasten the cutting-off means to the hand-held power tool. The tool fitting is for example a drill chuck. The hand-held power tool preferably comprises an exchangeable battery which is designed to supply the motor with electrical energy. The hand-held power tool preferably comprises a main handle which is arranged at the rear, and the side handle which is arranged at the front, i.e. in the vicinity of the drill chuck (on the side facing the drill chuck).

In particular, the side handle may also be referred to as the front handle and the main handle as the rear handle.

The eyelet portion preferably comprises a closed annular portion. A safety belt here means an elongate flexible fastening means, such as, for example, a cable, a chain, a belt or a strap. Furthermore, the safety belt can be encompassed by the assembly and can optionally be connected to the eyelet portion. The safety belt can comprise, for example, a fastening element, for example a snap hook or the like, which is designed to connect the safety belt releasably to the eyelet portion. Furthermore, the safety belt can comprise a further fastening element. The further fastening element is fastenable, for example, to an item of clothing or to a supporting structure, for example to a railing or to a wall portion.

The eyelet device is preferably releasably attachable to the clamping ring. This has the advantage that the clamping ring and the eyelet device can be separated from each other without being destroyed. The eyelet device is preferably fastened to the clamping ring. In particular, the eyelet device is fastened to the clamping ring by means of a form fit. For example, in a first step, the eyelet device is attached to the clamping ring, and in a second and subsequent step, the side handle together with eyelet device is attached to the round portion of the hand-held power tool. Preferably, the eyelet portion comprises a passage opening in order for the fastening element of the safety belt to be hooked onto the eyelet portion. In an attached state of the eyelet device to the clamping ring, the passage opening extends in particular from rear to front—in relation to the hand-held power tool. For example, a passage opening of the clamping ring also extends from rear to front. In particular, the eyelet device is formed from metal or plastic.

In one embodiment, the eyelet device comprises a fastening portion which is configured to be arranged at least partially between the round portion of the hand-held power tool and the clamping ring when the eyelet device is attached to the clamping ring and the side handle is attached to the round portion of the hand-held power tool.

In particular, the fastening portion is clamped between the round portion and the clamping ring. Preferably, the eyelet device is fixed by means of an increase of a clamping force in a radial direction of the clamping ring. This has the advantage that the eyelet device can be securely connected to the clamping ring. It is advantageously the case, for example, that no additional connecting means are required in order to attach the eyelet device to the clamping ring. Preferably, a further fastening portion is provided which is configured to be arranged at least partially between the round portion of the hand-held power tool and the clamping ring. For example, the fastening portion and the further fastening portion are of identical design. In particular, the fastening portion and the further fastening portion are provided so as to be spaced apart from one another.

In a further embodiment, the clamping ring is led through the fastening portion when the eyelet device is attached to the clamping ring.

Preferably, the clamping ring is configured to lead the fastening portion in a circumferential direction of the clamping ring. Preferably, the fastening portion forms a form fit with the clamping ring, such that the fastening portion is fastened in a form-fitting manner to the clamping ring only in the radial direction and/or in an axial direction of the clamping ring. Here, the axial direction of the clamping ring runs from rear to front—in relation to the hand-held power tool—and perpendicular to the radial direction.

In a further embodiment, the fastening portion at least partially surrounds the clamping ring when the eyelet device is attached to the clamping ring.

In particular, the fastening portion surrounds the clamping ring at least in C-shaped or U-shaped fashion.

In a further embodiment, the eyelet device comprises a further fastening portion, through which the clamping ring is led when the eyelet device is attached to the clamping ring.

This has the advantage that the eyelet device is connectable at least at two points to the clamping ring. Stable support of the eyelet portion on the clamping ring is thus ensured. Preferably, the fastening portion and the further fastening portion are arranged spaced apart from one another in the circumferential direction of the clamping ring. In particular, the fastening portion and the further fastening portion are adapted to a circumference of the clamping ring. Here, the fastening portion and/or the further fastening portion are/is for example of arcuately curved form.

In a further embodiment, the fastening portion and the further fastening portion are connected to one another by means of the eyelet portion.

A fixed spacing between the fastening portion and the further fastening portion is advantageously ensured by means of the eyelet portion. Preferably, the fastening element of the safety belt is provided between the fastening portion and the further fastening portion in the circumferential direction of the clamping ring when the fastening element is connected to the eyelet device.

In a further embodiment, the eyelet portion comprises a connecting web which connects the fastening portion and the further fastening portion to one another.

Preferably, the web is of arcuately curved or kinked form, in particular in the circumferential direction of the clamping ring.

In a further embodiment, the eyelet portion comprises a further connecting web which is arranged parallel to the connecting web and which connects the fastening portion and the further fastening portion to one another.

It is advantageously thus possible to form a slim and stiff eyelet device. For example, the connecting web and the further connecting web are of identical form. Alternatively, the connecting web and the further connecting web are of different form.

In a further embodiment, the connecting web and the further connecting web are arranged axially or radially adjacent to one another.

"Axially" means in relation to the axial direction. Connecting webs arranged radially adjacent to one another are in particular of different form. Connecting webs arranged axially adjacent to one another are in particular of identical form.

In a further embodiment, the eyelet device is attachable so as to be movable along a circumference of the clamping ring.

Furthermore, the eyelet device can be attached at different points of the clamping ring, such that different positions of the eyelet device relative to the side handle are possible. It is advantageously thus possible for the operator to arrange the eyelet device as required in the present situation. For example, the eyelet device can be positioned above the housing of the hand-held power tool or so as to project to the side. An expedient and ergonomic assembly is thus provided. Preferably, the eyelet device and the clamping ring are formed such that the eyelet device can be arrested relative to the clamping ring.

In a further embodiment, the eyelet portion is arranged radially outside the clamping ring when the eyelet device is attached to the clamping ring.

The eyelet portion is thus advantageously easily accessible for the fastening element of the safety belt.

In a further embodiment, the eyelet portion is arranged axially adjacent to the clamping ring when the eyelet device is attached to the clamping ring.

In particular, it is thus possible to simplify the attachability of the eyelet device to the clamping ring. Preferably, the fastening portion and/or the further fastening portion can be introduced between the clamping ring and the round portion of the hand-held power tool and hooked onto the clamping ring. For this purpose, it is for example the case that the fastening portion and/or the further fastening portion are of hook-shaped, in particular J-shaped form. Alternatively, the eyelet portion may be arranged so as to axially overlap the clamping ring (that is to say not axially adjacent to the clamping ring) when the eyelet device is attached to the clamping ring.

In a further embodiment, the eyelet device comprises a first half and a second half which are connectable to one another in an axial direction, wherein, in the connected state of the first and second halves, each half partially surrounds the clamping ring when the eyelet device is attached to the clamping ring.

This has the advantage that installation of the eyelet device on the clamping ring is simplified. Preferably, the first half and the second half are of symmetrical form. In particular, the first half and the second half are of identical form. Preferably, the first half and the second half are connectable to one another by means of a plug-type connection, in particular a snap-action or detent connection. Preferably, the first half surrounds the clamping ring in U-shaped fashion from one side of the clamping ring, wherein the second half surrounds the clamping ring in U-shaped fashion from the other side of the clamping ring.

Also provided is a hand-held power tool having an assembly as described above.

In one embodiment, the hand-held power tool comprises a round portion, which is at least partially surrounded by the clamping ring for the rotatable attachment of the side handle to the round portion, and a main handle, which is arranged behind the side handle.

Preferably, the round portion is arranged concentrically with respect to the drill chuck of the hand-held power tool. For example, the round portion is a part of the housing of the hand-held power tool. The round portion is preferably formed from plastic.

The embodiments and features described for the assembly apply correspondingly to the hand-held power tool and vice versa.

BRIEF DESCRIPTION OF THE FIGURES

The following description explains the invention with reference to exemplary embodiments and figures. In the figures.

Identical or functionally identical elements are indicated by the same reference symbols in the figures, unless stated otherwise.

DETAILED DESCRIPTION

Figure 1:
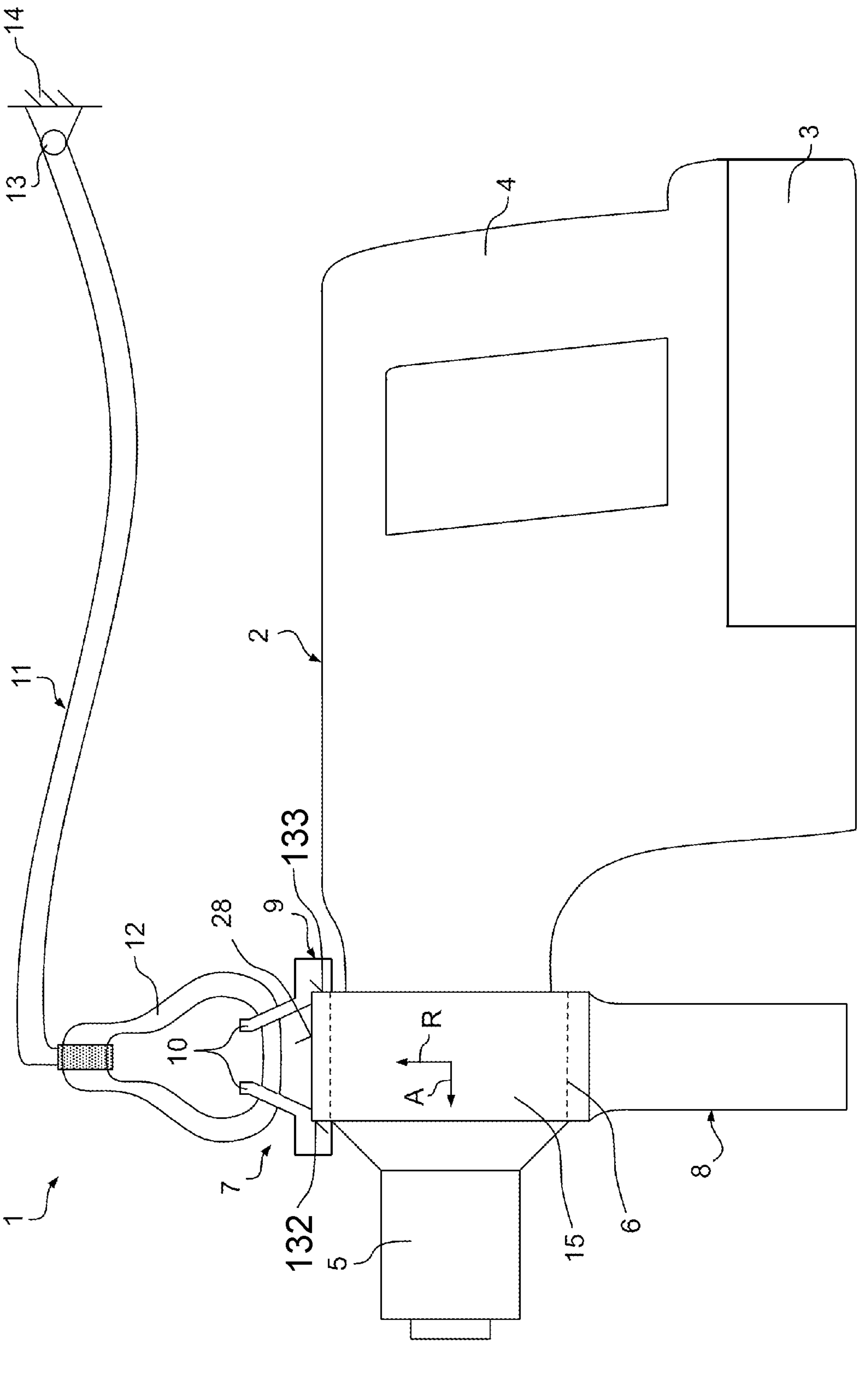
FIG. 1 shows a schematic side view of a hand-held power tool.

FIG. 1 shows a schematic side view of a hand-held power tool 1. The hand-held power tool 1 is, for example, a hammer drill, a chisel hammer, a core drill, a saw, a grinding machine, a screwdriver, a bolt driver or a saw. The hand-held power tool 1 comprises a housing 2, to which, for example, a battery 3 is fastened. Alternatively, it is also possible for an electrical cable to be fastened to the housing 2, which electrical cable is connectable to a power socket (not illustrated). The housing 2 furthermore comprises a main handle 4, which is arranged at the rear. A tool fitting 5 for the fastening of a tool is also provided. Here, the tool fitting 5 is provided at the front on the hand-held power tool 1. The tool fitting 5 is for example a drill chuck for a drill or screwdriver. A cut-off disk, grinding disk, saw blade etc. can be fastened to other tool fittings. Furthermore, the hand-held power tool 1 comprises a cylindrical round portion 6 (indicated by dashed lines) which is arranged between the main handle 4 and the tool fitting 5. The round portion 6 is for example cylindrical.

Furthermore, an assembly 7 with a side handle 8 for the hand-held power tool 1 and with an eyelet device 9 is provided. The eyelet device 9 comprises an eyelet portion which is configured to be connected to a safety belt 11. Preferably, the safety belt 11 comprises a fastening element 12, in particular a snap hook, which is configured to be detachably connected to the eyelet portion 10. For this purpose, the eyelet portion 10 is formed for example as a closed ring element. The fastening element 12 can thus be securely hooked into the eyelet portion 10.

For example, the safety belt 11 comprises a further fastening element 13, in particular a snap hook, which is configured to be fastened to a support structure 14 or a person, in particular an operator (not illustrated). By means of the assembly 7 and by means of the safety belt 11, it is possible to prevent the hand-held power tool 1 from falling from a building or a scaffold and causing bodily harm. For example, the fastening element 12 is hooked into or mounted on the eyelet portion 10 in order to form a form-fitting connection between the eyelet portion 10 and the fastening element 12.

FIG. 1 shows the side handle 8 and the eyelet device 9 in a connected state. The side handle 8 comprises a clamping ring 15 which is configured to attach the side handle 8 to the round portion 6 of the hand-held power tool 1. The clamping ring 15 comprises, for example, an annular clamping strap. The round portion 6 serves for example as a seat for the side handle 8. Furthermore, the eyelet device 9 is configured to be attached to the clamping ring 15. A radial direction R extends radially with respect to the ring element 15. An axial direction A extends perpendicularly with respect to the radial direction R. Here, the axial direction A points from the main handle 4 to the tool fitting 5, and thus from rear to front. In particular, the eyelet portion 10 is arranged radially outside the clamping ring 15. For example, the hand-held power tool 1 may comprise the assembly 7.

Figure 2:
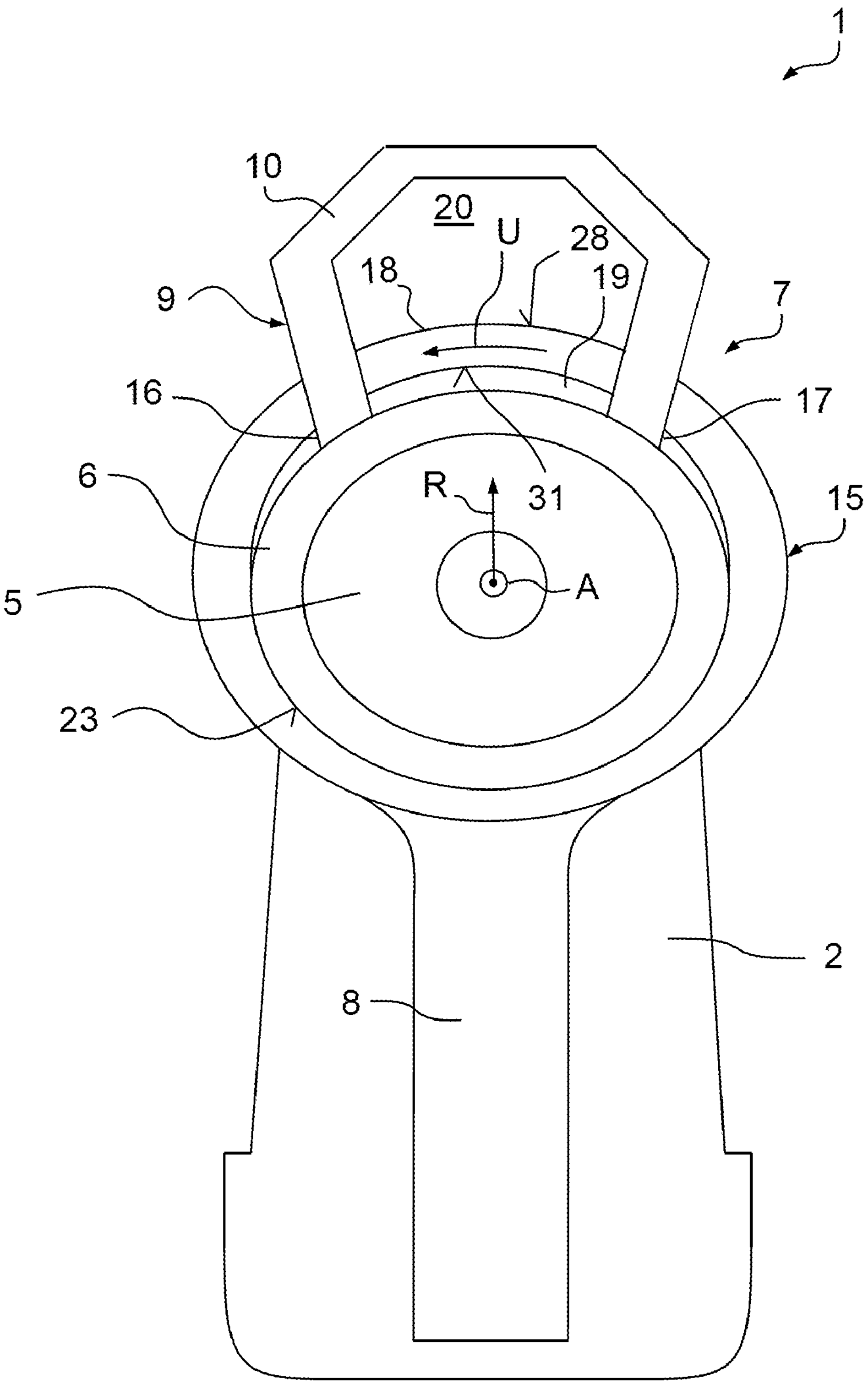
FIG. 2 shows a schematic front view of the hand-held power tool as per FIG. 1.

FIG. 2 shows the hand-held power tool 1 in a schematic front view. Here, the eyelet device 9 comprises a fastening portion 16 which is configured to be arranged at least partially between the round portion 6 of the hand-held power tool 1 and the clamping ring 15. Furthermore, the eyelet device 9 may comprise a further fastening portion 17 which is configured to be arranged at least partially between the round portion 6 and the clamping ring 15. The fastening portion 16 and the further fastening portion 17 are arranged spaced apart in a circumferential direction U which points perpendicular to the radial direction R and which runs along a circumference 18 of the clamping ring 15. In particular, the fastening portion 16 and the further fastening portion 17 are of identical design.

The fastening portion 16 and/or the further fastening portion 17 in this case engage into an intermediate space 19 between the clamping ring 15 and the round portion 6. In particular, the first fastening portion 16 and/or the further fastening portion 17 is clamped between the round portion 6 and the clamping ring 15. The fastening portion 16 and the further fastening portion 17 are connected to one another by means of the eyelet portion 10. Preferably, the eyelet device 9 is provided so as to be movable along the circumference 18 of the clamping ring 15. Here, the operator (not illustrated) can manually adjust the position of the eyelet device 9 relative to the hand-held power tool 2 and/or relative to the side handle 8. The eyelet device 9 is preferably fixable in this position. The clamping ring 15 is preferably at least partially or entirely of circular-ring-shaped form.

The side handle 8 may also be provided so as to be movable relative to the housing 2. For this purpose, the round portion 6 is at least partially surrounded by the clamping ring 15. Preferably, the eyelet device 9 is fixed by means of an increase of a clamping force in the radial direction R of the clamping ring 15. This may for example be performed together with an arresting of the side handle 8 relative to the housing 2. For such arresting, the hand-held power tool 1 may for example comprise an arresting means. The arresting means is composed for example of the clamping strap, the length of which is lengthened and shortened by rotation of the handle region about its longitudinal axis. Furthermore, the eyelet portion 10 surrounds a passage opening 20 into which the fastening element 12 (see FIG. 1) engages. A part of the fastening element 12 thus extends through the passage opening 20, such that a form-fitting connection is formed between the fastening element 12 and the eyelet device 9 (see FIG. 1).

Figure 3:
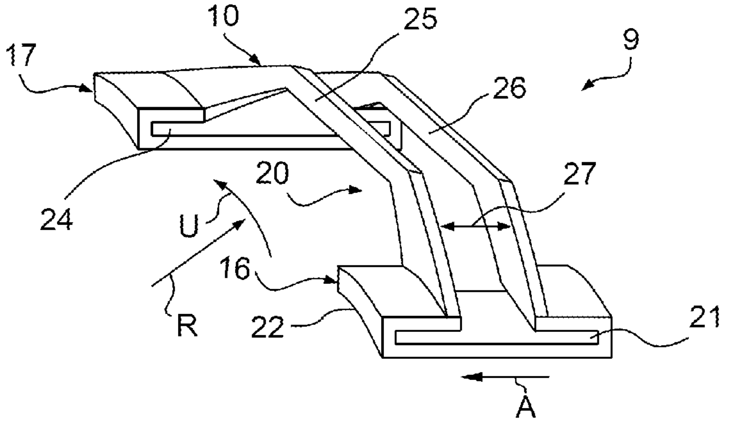
FIG. 3 shows a schematic perspective view of a first embodiment of an eyelet device of the hand-held power tool as per FIG. 1.

FIG. 3 shows the eyelet device 9 in a schematic perspective view. Here, the clamping ring 15 (see FIG. 1) is not illustrated. For simplification, the circumferential direction U, the radial direction R and the axial direction A of the clamping ring 15 are nevertheless referenced. The clamping ring 15 (see FIG. 1) is led through the fastening portion 16. The fastening portion 16 comprises a receptacle region 21 through which the clamping ring 15 can be led. The fastening portion 16 has an underside 22 which is curved and which is thus adapted to an outer surface 23 of the round portion 6 (see FIG. 2).

The receptacle region 21, too, is for example of curved form and thus adapted to a round form of the clamping ring 15. Preferably, the receptacle region 21 is at least partially formed as a negative form of the clamping ring 15. The fastening portion 16 at least partially surrounds the clamping ring 15 when the eyelet device 9 is attached to the clamping ring 15. The clamping ring 15 (see FIG. 2) is also led through the further fastening portion 17 when the eyelet device 9 is attached to the clamping ring 15.

For this purpose, the further fastening portion 17 also comprises a receptacle region 24. The receptacle region 24 and the receptacle region 21 are preferably of identical form. As viewed in cross section, the fastening portion 16 is of C-shaped form. Here, such a cross section runs through the axial direction A and the radial direction R. The fastening portion 16 makes contact in particular at least partially with an outer surface 28, an inner surface 31 and two face surfaces 132, 133 of the clamping ring 15. In particular, the fastening portion 16 surrounds the clamping ring 15 in at least C-shaped or at least U-shaped fashion.

Preferably, the fastening portion 16 and the further fastening portion 17 are of identical form. Furthermore, the eyelet portion 10 comprises a connecting web 25 which connects the fastening portion 16 and the further fastening portion 17. Here, the connecting web 25 is of arcuate, U-shaped, V-shaped or similar form. The fastening portion 16, the further fastening portion 17 and the connecting web 25 are preferably of integral form. In particular, only one connecting web 25 is provided in order to connect the fastening portion 16 to the fastening portion 17 (not illustrated).

For example, the eyelet portion 10 comprises a further connecting web 26 which is arranged parallel to the connecting web 25 and which connects the fastening portion 16 and the further fastening portion 17 to one another. Here, the connecting web 25 and the further connecting web 26 are arranged adjacent to one another with respect to the axial direction A. A gap 27 is therefore formed between the connecting web 25 and the further connecting web 26. The fastening portion 16, the further fastening portion 17, the connecting web 25 and the further connecting web 26 are preferably of materially integral form.

The connecting web 25 and the further connecting web 26 are for example of identical form. The passage opening 20 is defined by both connecting webs 25, 26. In particular, the passage opening 20 is open counter to the radial direction R, and thus downwardly, when the eyelet device 9 is not attached to the clamping ring 15 (see FIG. 2). Here, the passage opening 20 is delimited by the outer surface 28 of the clamping ring 15 (see FIG. 2) when the eyelet device 9 is attached to the clamping ring 15 (see FIG. 2). In particular, only the connecting web 25 and the further connecting web 26 are provided in order to connect the fastening portion 16 to the fastening portion 17 (not illustrated).

For example, in a first step, the eyelet device 9 is attached to the clamping ring 15. For this purpose, the clamping ring 15 is optionally opened (not illustrated) and led through the receptacle regions 21, 24. Alternatively, the eyelet device 9 may be elastically deformed, such that the clamping ring 15 can pass through the gap 27 into the receptacle regions 21, 24. Preferably, during the elastic deformation, the connecting web and the further connecting web 26 are moved away from one another. In a second and subsequent step, the side handle 8 together with eyelet device 9 is attached to the round portion 6 of the hand-held power tool 1.

Figure 4:
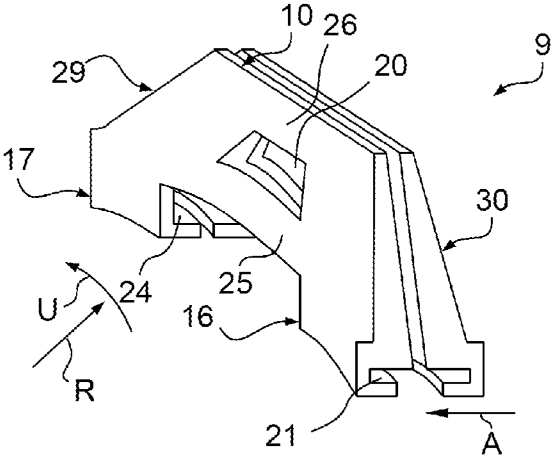
FIG. 4 shows a schematic perspective view of a further embodiment of the eyelet device of the hand-held power tool as per FIG. 1.

FIG. 4 shows a further embodiment of the eyelet device 9 in a schematic perspective view. By contrast to FIG. 3, the eyelet device 9 comprises a first half 29 and a second half 30, which are connectable to one another in an axial direction A. In the connected state of the first and second halves 29, 30, each half 29, 30 partially surrounds the clamping ring 15 (see FIG. 2) when the eyelet device 9 is attached to the clamping ring 15. Preferably, the first half 29 and the second half 30 are connectable by means of a releasable connection (not illustrated). For example, the releasable connection is a plug-type connection, in particular a clamping or snap-action connection. Alternatively, the first half 29 and the second half 30 are not connected to one another. For example, the first half 29 and the second half 30 are spaced apart from one another in the axial direction A when the eyelet device 9 is attached to the clamping ring 15.

The first half 29 comprises the fastening portion 16, the further fastening portion 17, the connecting web 25 and the further connecting web 26. Furthermore, the connecting web 25 and the further connecting web 26 are arranged radially adjacent to one another. Here, the passage opening 20 is arranged between the connecting web 25 and the further connecting web 26. The fastening portion 16 has a U shape which surrounds the clamping ring 15 in a U-shaped manner.

Preferably, the further fastening portion 17 is of identical form to the fastening portion 16. Furthermore, the second half 30 is for example of mirror-symmetrical form with respect to the first half 29. It is self-evident that the connecting means for fastening the first half 29 to the second half 30 are for example not included in such symmetry. Alternatively, it may be the case that the first half 29 is not fastened to the second half 30. In the fastened state of the eyelet device 9 to the clamping ring 15, it is for example the case that the first half 29 and the second half 30 are arranged axially adjacent to one another, in particular so as to be spaced apart, and in particular mirror-symmetrically. For example, the eyelet device 9 may, as shown in FIG. 4, be connected to the side handle 8 when the latter is already attached to the round portion 6.

Figure 5:
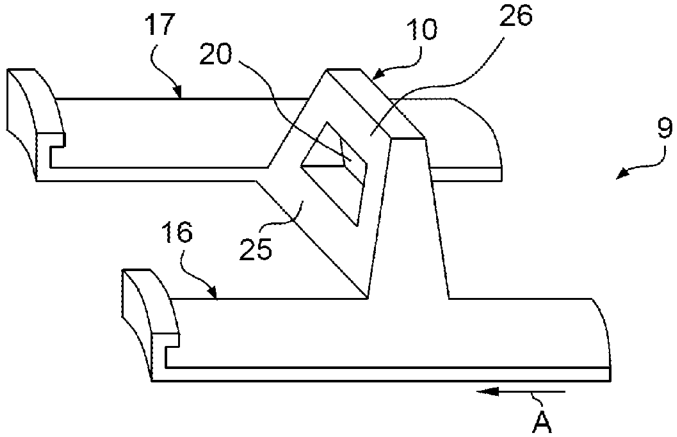
FIG. 5 shows a schematic perspective view of a further embodiment of the eyelet device of the hand-held power tool as per FIG. 1.

FIG. 5 shows a further embodiment of the eyelet device 9 in a schematic perspective view. By contrast to FIG. 3, the eyelet portion 10 is arranged axially adjacent to the clamping ring 15 (see FIG. 2) when the eyelet device 9 is attached to the clamping ring 15. The eyelet portion 10 can thus be attached closer to the main handle 4 (see FIG. 1). Alternatively, the eyelet portion 10 may—in the case of a reversed attachment—be attached closer to the tool fitting 5 (see FIG. 1). Furthermore, the fastening portion 16 is shaped so as to extend below the clamping ring 15 in the axial direction A and so as to be bent in the manner of a hook around the clamping ring 15 (see FIG. 1).

In this way, the fastening portion 16 can be easily hooked together with the clamping ring 15 (see FIG. 2) without, for example, the clamping ring 15 being led in a cumbersome manner through the fastening portion 16. For example, the eyelet device 9 may, as shown in FIG. 5, be connected to the side handle 8 when the latter is already attached to the round portion 6 (see FIG. 2). For example, the fastening portion 16 and/or the further fastening portion 17 is of hook-shaped, in particular J-shaped form. The connecting web 25 and further connecting web 26 are arranged radially spaced apart, wherein the passage opening 20 is provided between the connecting webs 25, 26.

Figure 6:
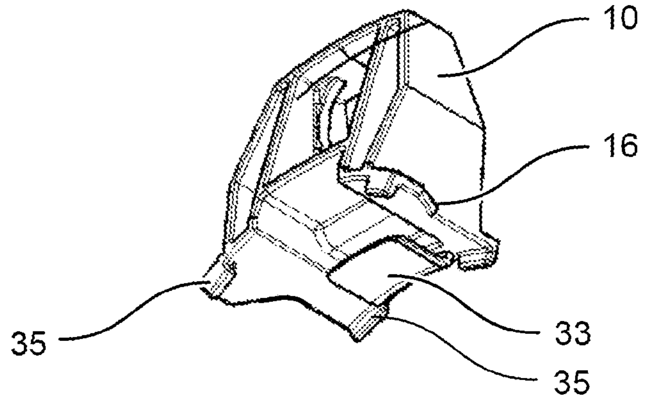
FIG. 6 shows a schematic perspective view of a further embodiment of the eyelet device of the hand-held power tool as per FIG. 1.
Figure 7:
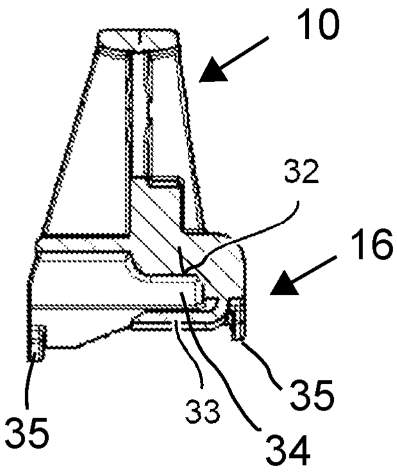
FIG. 7 shows a cross section through the eyelet device in the plane A-A.

FIGS. 6 and 7 show a further embodiment of the eyelet device 9 in a schematic perspective view and a longitudinal section. The single-piece eyelet device 9 has an eyelet portion 10 and a fastening portion 16. The eyelet portion 10 comprises an opening which is in the shape of a closed ring and into which, for example, a snap hook can be engaged.

The fastening portion 16 can engage around a portion of the clamping ring 15. The fastening portion has a pedestal surface 32 and a tongue 33, which are spaced apart from one another by a groove 34. The groove 34 is preferably of partially form-fitting design with respect to the clamping ring 15, for example with a cylindrical profile. The depth of the groove 34 may correspond to a width of the clamping ring 15 as measured along the axial axis A. The pedestal surface 32 is preferably cylindrical at least in certain portions in order to lie against the radial outer side of the clamping ring 15. The tongue 33 has a cylindrical side which faces toward the pedestal surface 32 and against which the radial inner side of the clamping ring 15 lies. The tongue 33 has a relatively small dimension along the axial axis A and is thus completely concealed by the pedestal surface 32. The fastening portion 16 may have radially projecting feet 35 which engage into corresponding depressions in a housing of the hand-held power tool.

LIST OF REFERENCE SIGNS

1. Hand-held power tool
2 Housing
3 Battery
4 Main handle
5 Tool fitting
6 Round portion
7 Assembly
8 Side handle
9 Eyelet device
10 Eyelet portion
11 Safety belt
12 Fastening element
13 Further fastening element
14 Support structure
15 Clamping ring
16 Fastening portion
17 Further fastening portion
18 Circumference
19 Intermediate space
20 Passage opening
21 Receptacle region
22 Underside
23 Outer surface
24 Receptacle region
25 Connecting web
26 Further connecting web
27 Gap
28 Outer surface
29 First half
30 Second half
31 Inner surface
32 Pedestal surface
33 Tongue
34 Groove
132 Face surface
133 Face surface
A Axial direction
R Radial direction
U Circumferential direction

What is claimed is:

1. An assembly comprising:
a side handle for a hand-held power tool; and
an eyelet device including an eyelet portion configured to be connected to a safety belt,
the side handle including a clamping ring configured to attach the side handle to a round portion of the hand-held power tool, and the eyelet device configured to be attached to the clamping ring; wherein the eyelet device includes a further fastening portion through which the clamping ring is led when the eyelet device is attached to the clamping ring.

2. The assembly as recited in claim 1 wherein the eyelet device includes a fastening portion configured to be arranged at least partially between the round portion of the hand-held power tool and the clamping ring when the eyelet device is attached to the clamping ring and the side handle is attached to the round portion of the hand-held power tool.

3. The assembly as recited in claim 2 wherein the clamping ring is led through the fastening portion when the eyelet device is attached to the clamping ring.

4. The assembly as recited in claim 2 wherein the fastening portion at least partially surrounds the clamping ring when the eyelet device is attached to the clamping ring.

5. The assembly as recited in claim 1 wherein the fastening portion and the further fastening portion are connected to one another via the eyelet portion.

6. The assembly as recited in claim 5 wherein the eyelet portion includes a connecting web connecting the fastening portion and the further fastening portion.

7. The assembly as recited in claim 6 wherein the eyelet portion includes a further connecting web arranged parallel to the connecting web and connecting the fastening portion and the further fastening portion.

8. The assembly as recited in claim 7 wherein the connecting web and the further connecting web are arranged axially or radially adjacent to one another.

9. The assembly as recited in claim 1 wherein the eyelet device is attachable so as to be movable along a circumference of the clamping ring.

10. The assembly as recited in claim 1 wherein the eyelet portion is arranged radially outside the clamping ring when the eyelet device is attached to the clamping ring.

11. The assembly as recited in claim 1 wherein the eyelet portion is arranged axially adjacent to the clamping ring when the eyelet device is attached to the clamping ring.

12. The assembly as recited in claim 1 wherein the eyelet device includes a first half and a second half connectable to one another in an axial direction, wherein, in a connected state of the first and second halves, each of the first and second halves partially surrounds the clamping ring when the eyelet device is attached to the clamping ring.

13. A hand-held power tool comprising the assembly as recited in claim 1.

14. The hand-held power tool as recited in claim 13 comprising the round portion, the round portion being at least partially surrounded by the clamping ring for the attachment of the side handle to the round portion, and comprising a main handle arranged behind the side handle.

15. An assembly comprising:
a side handle for a hand-held power tool;
a safety belt; and
an eyelet device including an eyelet portion connected to the safety belt,
the side handle including a clamping ring configured to attach the side handle to a round portion of the hand-held power tool, and the eyelet device configured to be attached to the clamping ring,
the eyelet device including a fastening portion configured to be arranged at least partially between the round portion of the hand-held power tool and the clamping ring when the eyelet device is attached to the clamping ring and the side handle is attached to the round portion of the hand-held power tool.

16. The assembly as recited in claim 15 wherein the clamping ring is led through the fastening portion when the eyelet device is attached to the clamping ring.

17. The assembly as recited in claim 15 wherein the fastening portion at least partially surrounds the clamping ring when the eyelet device is attached to the clamping ring.

18. The assembly as recited in claim 17 wherein the fastening portion and the further fastening portion are connected to one another via the eyelet portion.

19. The assembly as recited in claim 18 wherein the eyelet portion includes a connecting web connecting the fastening portion and the further fastening portion.

* * * * *